(No Model.)

W. B. WIGGINS.
ANIMAL TRAP.

No. 340,269. Patented Apr. 20, 1886.

Witnesses:
D. H. Graves
R. A. Morrison

Inventor:
William B. Wiggins
By Robt. B. Vance Atty

United States Patent Office.

WILLIAM B. WIGGINS, OF ROBBINSVILLE, NORTH CAROLINA.

ANIMAL-TRAP.

SPECIFICATION forming part of Letters Patent No. 340,269, dated April 20, 1886

Application filed April 10, 1885. Serial No. 161,799. (No model.)

*To all whom it may concern:*

Be it known that I, WILLIAM B. WIGGINS, a citizen of the United States, residing at Robbinsville, in the county of Graham and State of North Carolina, have invented certain new and useful Improvements in Animal-Traps, of which the following is a specification, reference being had to the accompanying drawings, in which—

Figure 1:
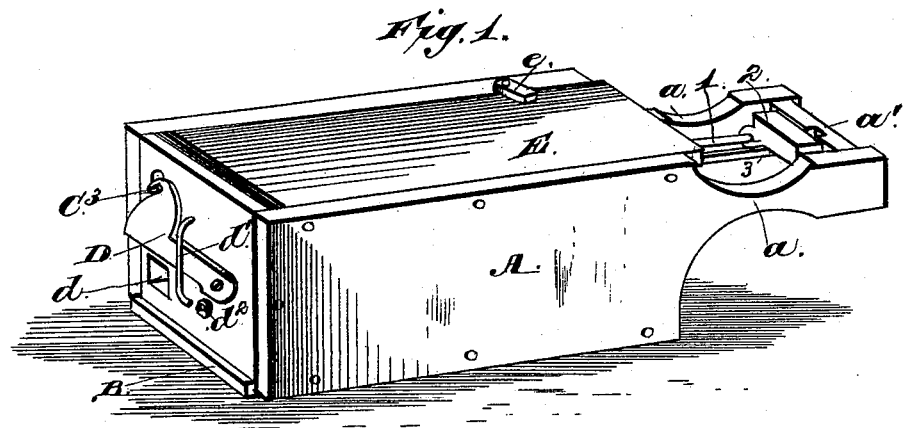
Figure 2:
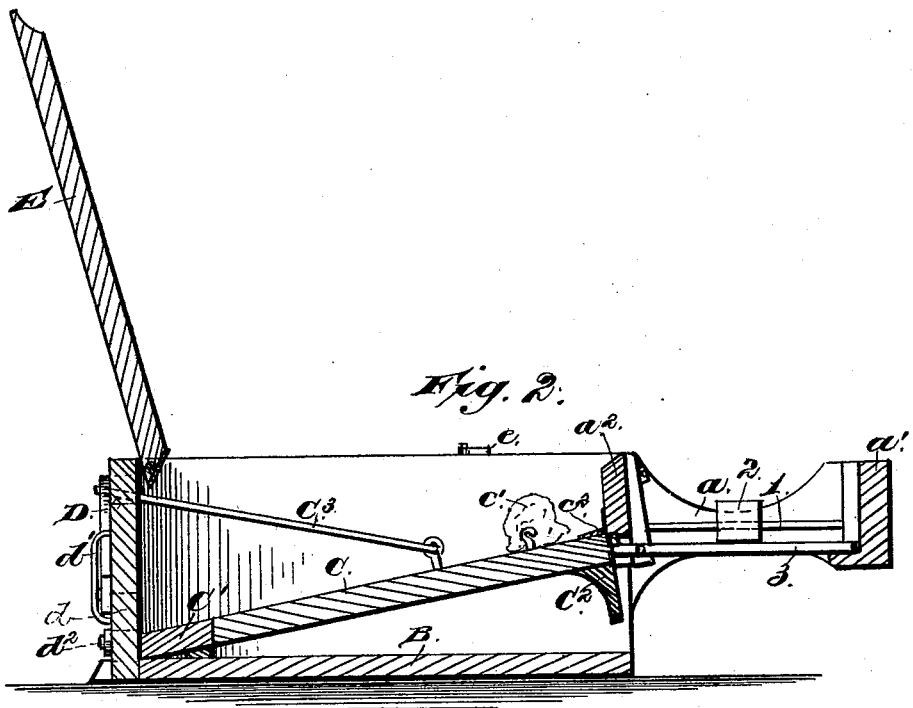

Figure 1 is a perspective view of the trap. Fig. 2 is a longitudinal section.

My improvement relates to that class of traps which are provided with a tilting platform, a trigger or lever for supporting the platform when the trap is set, with the aid of a suitable weight or counterpoise at one end and a latch at the other; and my invention consists in making the weight adjustable, together with other details in the structure of the trap, which will be hereinafter fully explained.

In the drawings like letters of reference indicate corresponding parts.

A is the body of the trap, which may be of any suitable form. In the illustration, which is the preferred form, it consists of an oblong rectangular box, the sides of which are extended and cut away to form the arms $a\,a$, which are connected near their ends by the cross-piece $a'$. Across the front end of the box proper, about half the depth of the box, and extending between the arms $a\,a$, is a second cross-piece, $a^2$. (See Fig. 2.) These parts $a\,a$, $a'$, and $a^2$ support the trigger or catch and the weight mechanism, as will be hereinafter explained.

The trap has a closed bottom, B, and inclined tilting platform C. This platform is inside of the trap, and may be pivoted by means of pintles to the sides of the box or by means of hinges on its under side to the inclined piece C′, which is secured to the bottom of the trap near its rear end. On the under side of the front end of the platform is a depending piece or bracket, $C^2$, which closes the lower or open part of the rear of the trap when the platform is down. A suitable hook or catch is secured on top of the platform near its rear end, to hold the bait $c'$. A rod, $C^3$, is attached to the platform by means of a screw eye or hook, and the free end of this rod extends through a hole in the front end of the trap near the top, and projects slightly beyond its outside wall. The rear edge of the platform is provided with a lug, $c^2$, to receive the end of the trigger.

The front of the trap is provided with a latch, D, which is formed, as shown, with a hook or notch at its top for engaging the projecting end of the rod $C^3$. This latch is pivoted to one side of the end piece, and when down closes the aperture $d$, through which the animal enters the trap. It is guided and limited in its movements by a bracket or staple-like device, $d'$, which is secured to the end of the trap across the arm of the latch. A pivoted stop or button, $d^2$, is secured below the arm of the latch, and may be turned up under it when it is raised to facilitate the operation of setting, and also to hold the door open when it is desired to drive animals out of the trap.

The top E of the box is also pivoted or hinged for easy access to the interior in applying the bait, cleaning the trap, &c. A button, $e$, applied at one edge, is for the purpose of keeping the lid closed.

At the rear end of the trap is a rod, 1, which is rigidly secured to the two cross-pieces $a'\,a^2$, and extends between them. A weight, 2, which is square or rectangular in form, is pivoted eccentrically on the rod, so that it may be rotated thereon, or be adjusted longitudinally. Pivoted to suitable lugs on the rear of the cross-piece $a^3$ is the trigger or latch 3, for supporting the rear end of the platform when the trap is set. It is a lever having a long and a short arm, the latter engaging with the lug on the rear edge of the platform, and the long arm of the lever is for the weight to rest on when the trap is set. This lever is substantially parallel with the rod which carries the weight, and the rear end of the lever or trigger rests in a recess in the rear cross-piece, $a'$, as clearly shown in Fig. 2.

The edges of the platform and box where they are adjacent may be lined with sheet metal, to prevent injury to the trap or the escape of the animal.

The bait being first applied, to set the trap the latch at the front end is raised, and the button $d^2$ is turned underneath it to support it until the rod $C^3$ engages with the hook or notch. The trigger or lever 3 is turned upward from the recess in which it rests in the cross-piece, the platform is raised, and the short arm of the lever engages with the lug on the under side of the rear end of the platform, at the same time the end of the rod $C^3$ is projected through the hole in the front end of the trap and engages with the hook or notch in the latch. The weight 2 is rotated on the rod 1, and adjusted thereon toward or away from the body of the trap, to compensate for the size of the animal it is desired to entrap. The button $d^2$ is now turned down out of the way of the latch, the lever or trigger in the meantime having fallen back to its normal position in the recess in the rear cross-piece, the lid is closed and secured, and the trap is set.

When the animal enters the aperture in the front of the trap and ascends the platform to secure the bait, his weight releases the lever or trigger from the lug on the under side of the platform, and as the latter drops the rod $C^3$ is withdrawn from engagement with the latch, which drops down, closes the entrance, and secures the animal.

The trap may be constructed of any suitable material; but if made of soft wood it should be lined with sheet metal to prevent damage by or the escape of the animal.

Having thus described my invention, what I claim as new, and desire to secure by Letters Patent, is—

The combination, in an animal-trap, of the tilting platform with its depending arm or bracket and a lug on its rear under side, and carrying a pivoted rod which projects through the front of the trap, a latch to engage the rod when set and to cover the entrance when closed, a pivoted trigger or lever at the rear of the trap, a rotating and longitudinally-adjustable weight, and a hinged top or cover, all constructed and adapted to operate substantially as set forth.

In testimony whereof I affix my signature in presence of two witnesses.

WILLIAM B. WIGGINS.

Witnesses:
ROBT. H. SHERRILL,
GEO. B. WALKER.